Feb. 13, 1962 W. E. ALTMANN 3,020,991
SELECTIVELY ENGAGEABLE TRANSMISSION
Filed Jan. 13, 1958
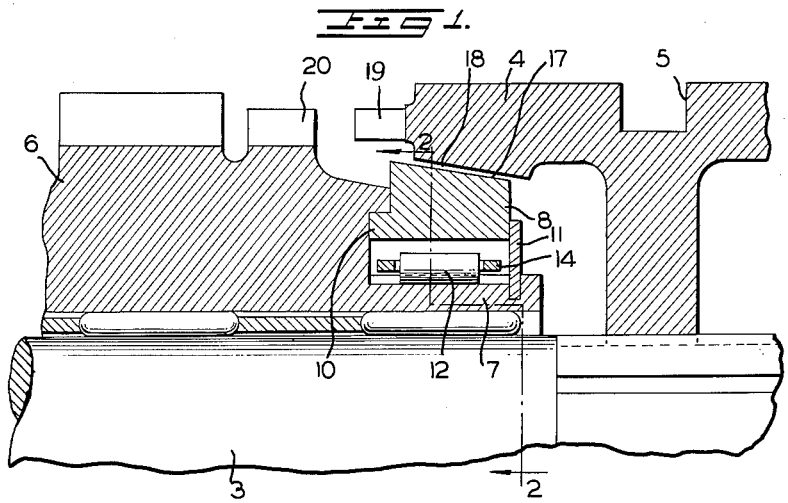
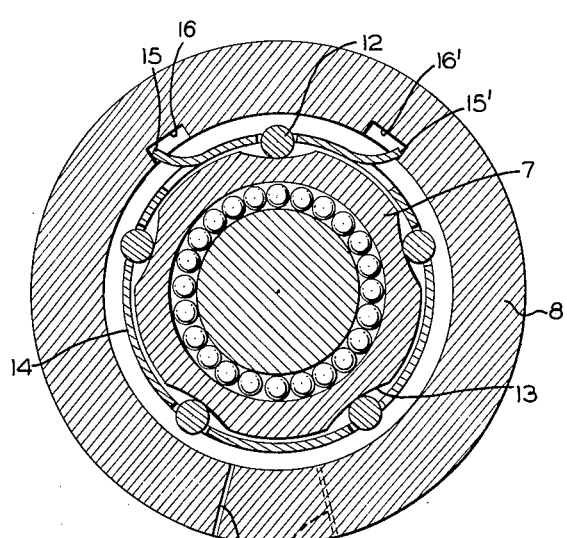
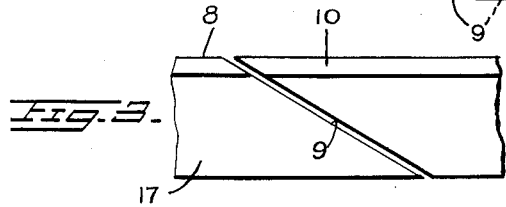
INVENTOR
WERNER E. ALTMANN
BY *Dicke & Craig*
ATTORNEYS.

United States Patent Office 3,020,991
Patented Feb. 13, 1962

3,020,991
SELECTIVELY ENGAGEABLE TRANSMISSION
Werner E. Altmann, Stuttgart, Germany, assignor to Daimler-Benz Aktiengesellschaft, Stuttgart-Unterturkheim, Germany
Filed Jan. 13, 1958, Ser. No. 708,523
Claims priority, application Germany Jan. 19, 1957
6 Claims. (Cl. 192—53)

The present invention relates to a change-speed transmission which is adapted to be selectively engageable in a step-like manner, particularly to a motor vehicle transmission provided with one or several pairs of gears continuously meshing with each other of which the freely rotatably mounted gears are adapted to be selectively connected with the supporting shaft thereof, and which are provided at one of the two parts to be connected with each other with a synchronizing ring frictionally engaging the counter-part thereof.

Change-speed transmissions are known in the prior art in which, for purposes of selecting the speed, a freely rotatably mounted gear which is in continuous meshing engagement with another gear is rigidly connected by an axially displaceable hub part with the shaft thereof.

Furthermore, it is known in the prior art to provide, for purposes of obtaining synchronization, a springy or flexible slotted synchronizing ring at the freely rotatably mounted gear. This type of synchronizing ring is intended, by reason of its inherent elasticity or flexibility, to block, upon the occurrence of a friction moment between itself and the hub part arranged at the shaft, any further movement of the hub part in the direction of the final engagement of the two parts. In this type of an arrangement, the synchronizing ring is intended to operate in such a manner that essentially with the absence of any friction moment, i.e., when synchronism is attained, the locking or blocking effect is discontinued. However, it has been demonstrated in practice that the blocking effect of such known synchronizing rings is ordinarily not sufficient. As a result thereof, a safe and certain synchronization cannot be achieved. Furthermore, this type of synchronizing ring is prone to high wear and tear.

The present invention seeks to provide a change-speed transmission in which a secure blocking of the shifting can be obtained prior to the synchronization of the rotational speeds of the two parts to be connected with each other.

According to the present invention, the synchronizing ring used in connection with change-speed transmissions of the type mentioned hereinabove is connected over clamping members with the part carrying the same in such a manner that with a friction moment acting on the ring a relative rotation between the ring and the part carrying the same takes place, whereby the clamping members are brought into an effective position in which the clamping members rigidly connect the ring with the part carrying the same so that the ring blocks the ultimate or final engagement of the other part.

According to a preferred embodiment in accordance with the present invention, several clamping members evenly distributed over the entire circumference are provided which may be constructed as clamping rollers. Special clamping surfaces or wedging surfaces are coordinated to the clamping members at one of the two parts, either at the synchronizing ring or at the carrier part carrying the same. The clamping members or wedging members themselves, for example, the clamping rollers, are guided at the other of the two parts, either at the synchronizing ring or at the carrier part therefor by separate guide means in such a manner that the clamping members either are immovable with respect to the guide means or are movable only to a limited extent in the circumferential direction thereof.

The present invention offers the advantage that the synchronizing ring is pressed by the clamping members along the entire periphery thereof evenly outwardly against the countersurface of the other part. Consequently, the loading during abutment is evenly distributed over the entire circumference thereof. The blocking effect is based on the clamping or spreading effect of the clamping members and is, therefore, absolutely safe.

Moreover, the present invention primarily proposes to construct the clamping or wedging surfaces as relatively flat pockets arched or arcuate symmetrically in a circumferential direction so that the pockets or recesses are effective in both directions of rotation. It is understood, however, that the present invention is also applicable to embodiments provided with unilaterally inclined clamping surfaces which are effective only in one direction of rotation. Pockets or recesses for accommodating the clamping members are provided at the other part as guide means which may have about the same configuration as the clamping surfaces. Furthermore, abutment cams or the like disposed between the clamping members which may possibly be detachably secured at the guiding part may serve the same purposes. Particularly advantageous is a construction which has universal applicability, and in which the clamping members are guided by a cage in the manner of a ball bearing whereby the cage serves as guide member and is connected with a guiding part.

A slotted, radially springy ring provided with an external friction surface appropriately of conically truncated shape is provided as synchronizing ring. The cage to accommodate the clamping members is connected therewith by separate projections and the wedging or clamping surfaces are arranged in the carrier part. The slot in the slotted ring is disposed at an inclination to the ring axis so that the ends of the ring mutually overlap.

Accordingly, it is an object of the present invention to provide a shifting arrangement for change-speed transmissions which assures safe blocking of the full engagement thereof until synchronism is achieved between the parts to be engaged.

Another object of the present invention is the provision of a change-speed transmission provided with a synchronizing ring which is subject to less wear and tear due to distribution of the forces essentially evenly over the entire circumference of the ring.

A still further object of the present invention is the provision of a synchronizing ring between the two parts to be engaged in a selectively engageable change-speed transmission in which the synchronizing ring is so arranged and actuated by clamping members that the wear during operation effecting synchronization between the two parts is distributed over the entire circumference or peripheral surface of the ring.

These and other objects, features and advantages of the present invention will become more obvious from the following description when taken in connection with the accompanying drawing which shows, for purposes of illustration only, one embodiment in accordance with the present invention and wherein:

FIGURE 1 is a partial, longitudinal, axial cross-sectional view of a change-speed transmission in accordance with the present invention;

FIGURE 2 is a cross-sectional view taken along line 2—2 of FIGURE 1; and

FIGURE 3 is a partial developed view showing a slot in a synchronizing ring illustrated in FIGURES 1 and 2.

The following description of a preferred embodiment in accordance with the present invention which will follow hereinafter is intended to describe, for purposes of illustration only, how the inventive concept may be put into practical realization. In the illustrated embodiment, an arrangement with a slotted synchronizing ring serves as the basic element. However, the present invention is equally applicable also to synchronizing rings which are supported in an axially springy manner and which are closed upon themselves, i.e., which are endless and essentially non-springy in the radial direction thereof as distinguished from slotted or non-continuous rings, and which are further axially moved into the engaging position from a blocking position against a spring force. In such an arrangement, it is appropriate to construct the clamping or wedging surfaces and/or the countersurfaces thereof, i.e., for example, the guide pockets or the internal circumference of the synchronizing ring in a conical manner.

Referring now more particularly to the drawing, wherein like reference numerals are used throughout the two views to designate like parts, reference numeral 3 designates a shaft which may be a transmission output shaft. A hub portion 4 is arranged on the shaft 3 in such a manner as to be axially displaceable with respect thereto but forced to rotate in unison therewith, for example, by means of axial splines. A shifting fork or any other suitable shifting member (not shown) engages into the groove 5 of the hub portion 4. A gear 6 is loosely or freely rotatably supported on the shaft 3 by appropriate bearings, the gear 6 being in constant meshing engagement with another gear (not illustrated) which in turn is rigidly mounted on the countershaft of the transmission. For example, the gear 6 together with the countergear (not illustrated) may form the second speed of a motor vehicle transmission.

A unilateral cylindrical projection or extension 7 is provided at the gear 6 on which a synchronizing ring 8 is supported by means of clamping members 12. The synchronizing ring 8 is constructed as a radially springy, slotted or split ring whereby the slot or split 9 (FIGURE 2) is disposed at an inclination to the ring axis so that the ends of the ring 8 overlap with each other. The synchronizing ring 8 has a radial play with respect to the projection 7 so that the synchronizing ring 8 may be compressed radially for purposes of full engagement. The synchronizing ring 8 is further guided by a lateral projection or extension 10 thereof within an appropriate shoulder or recess in the gear wheel 6. A securing disk 11 of any appropriate construction retains the synchronizing ring 8 axially immovably.

Rollers 12 are provided between the synchronizing ring 8 and the projection 7 as clamping members which are evenly distributed over the entire circumference thereof and are supported in pockets or detents 13 at the cylindrical projection or extensions 7. The pockets 13 act as clamping or wedging surfaces and are constructed relatively flat and symmetrically arcuate with respect to the circumferential direction so that they produce a clamping or wedging effect in both directions of rotation.

The clamping rollers 12 are interconnected with each other and guided with respect to the ring 8 by means of a cage 14 in the manner of a ball or roller bearing. The cage 14, which is detachably secured by disk 11, has ball or roller accommodating openings, the peripheries of which act as abutment cams for the balls or rollers, and has projections or extensions 15 and 15' by means of which it engages in guiding recesses 16 and 16' provided in the synchronizing ring 8. The clamping rollers 12 are, therefore, forced to partake in any rotational movement of the synchronizing ring 8.

The synchronizing ring 8 is provided at the outer circumference thereof with a friction surface 17 of conically truncated shape. A complementary friction surface 18 is provided at the hub portion 4. Furthermore, claw members 19 are provided at the hub portion 4 for purposes of engagement with corresponding claw members 20 provided at the gear 6. Thus, the transmission in accordance with the present invention is also form-locking. However, it is also understood that the inventive concept of the present invention is equally applicable to force-locking transmissions in which final engagement is obtained in a force-locking manner, for example, by the friction surfaces 17 and 18 themselves or by other engageable friction surfaces, for instance, friction clutches, etc.

*Operation*

The operation of the arrangement in accordance with the present invention is as folows:

In the position illustrated in the drawing, the hub portion 4 is in the neutral position thereof. If it is assumed that the vehicle moves, for example, with a speed corresponding to the first speed, this means that the gear 6 of the second speed rotates faster than shaft 3. If the hub portion 4 is now moved toward the left, as viewed in FIGURE 1, for purposes of engagement of the second speed, the friction surface 18 comes into abutment against the friction surface 17 of the synchronizing ring 8. The latter is taken along by the friction moment and is rotated with respect to the gear 6, i.e., is left behind with respect thereto. As a result thereof, the cage 14 is also taken along over the extensions 15 and 15' by the synchronizing ring 8 so that the clamping rollers 12 are moved from the lowest or innermost positions thereof into an effective position in such a manner that the clamping rollers 12 are securely wedged or clamped between the synchronizing ring 8 and the clamping surfaces 13. This clamping effect or wedging effect produces a rigid connection, so to speak, between the synchronizing ring 8 and the gear 6 whereby a radial compression of the ring 8 is rendered impossible. This position corresponds to the blocking position which prevails for such length of time as a friction moment is effective on the synchronizing ring 8 as a result of the relative movement.

As soon as the rotational speed of the gear 6 and of the hub part 4 and therewith also of the shaft 5 have become about equal, the friction moment produced previously by relative movement disappears. As a result thereof, the clamping rollers 12 may return to their innermost positions in the pockets 13. The blocking effect therewith also is discontinued. The synchronizing ring 8 is no longer supported inwardly. The hub portion 4 may now be moved further in the axial direction toward the left as viewed in FIGURE 1 whereby the synchronizing ring 8 is radially compressed. The claw members 19 now are engaged with the claw members 20 of the gear 6 and the final shifting is therewith completed.

It is also possible to provide between the hub portion 4 and the shaft 3 inclined transmission surfaces in such a manner that an axial force component is produced by the torque which aids the shifting force applied to the hub portion 4. The pins (not shown) which are alternately secured to the hub portion 4 and the shaft 3 may thereby take the form shown in FIGURES 3 and 6 of my copending application Serial No. 708,413, filed January 13, 1958, and entitled "Disengageable Clutch Construction."

Furthermore, it is also possible to provide the friction surfaces 17 and 18 with separate oil wipe-off means, for example, transversely disposed key or wedge members secured in the friction surface 17 of the synchronizing ring 8, as more fully described in my copending application Serial No. 708,412, filed January 13, 1958, now Patent No. 2,942,712, and entitled "Selectively Engageable Change-Speed Transmission." Such an arrangement eliminates or at least reduces the oil film which disturbs the frictional engagement.

While I have shown and described one embodiment in accordance with the present invention, it is obvious that the same is not limited thereto but is susceptible of many changes and modifications within the spirit of the present invention. For example, instead of the claw members 19 and 20, force-locking devices may be substituted.

The configuration of the clamping members, of the cage and of the clamping surfaces, may also be modified within the spirit of the present invention, for example, by providing the pockets in the synchronizing ring and the recesses for engagement with the extensions 15 and 15' in the extension 7. Thus, it may be readily seen that the present invention is susceptible of many changes and modifications within the scope and spirit of the present invention, and I intend to cover all such changes and modifications as encompassed by the appended claims.

I claim:

1. In a step-like selectively engageable change-speed transmission having engaged and disengaged positions, a gear, shaft means, means freely rotatably supporting said gear on said shaft means, and means for selectively connecting said gear and said shaft means with each other including a first part operatively connected with said shaft means and engageable with said gear and a second part operatively connected with said gear and constituting radially compressible synchronizing ring means, both of said parts being provided with complementary friction surfaces, and connecting means including wedging roller means and means maintaining said wedging roller means spaced from said synchronizing ring means in said disengaged position, said connecting means connecting said synchronizing ring means with said gear in such a manner that upon the occurrence of a friction moment at said friction surfaces, a relative rotational movement between said synchronizing ring means and said gear takes place to bring said wedging means into an effective position in which said wedging means rigidly connects said synchronizing ring means with said gear and therewith prevents the final engagement of said first part with said gear, said gear and said first part being supported for relative axial movement toward each other and having a first position relative to each other in which they are blocked from engagement with each other, when said wedging means are in said effective position, and being movable beyond said first position toward each other for mutual engagement when they rotate in synchronism.

2. Apparatus according to claim 1 wherein said wedging roller means includes a plurality of wedging roller members evenly distributed about the circumference of said shaft.

3. Apparatus according to claim 1 wherein said synchronizing ring means is constructed as a split radially springy ring provided with an external truncated conical friction surface.

4. Apparatus according to claim 1 wherein said gear is provided with an axial extension for supporting thereon said synchronizing means, and further comprising means for axially securing said synchronizing means on said lateral extension.

5. In a step-like selectively engageable change-speed transmission, a gear, shaft means, means rotatably supporting said gear on said shaft means, and means for selectively connecting said gear and said shaft means with each other including a first part operatively connected with said shaft means and engageable with said gear and a second part operatively connected with said gear and constituting a synchronizing ring, both of said parts being provided with complementary engaging surfaces, and connecting means for connecting said synchronizing ring with said gear including automatic engaging means provided with a plurality of wedging means spaced from each other by cage means secured to said synchronizing ring in such a manner that upon occurrence of a friction moment at said engaging surfaces, a relative movement between said synchronizing ring and said gear takes place to rigidly connect said synchronizing ring with said gear by said engaging means and therewith prevent the final engagement of said first part with said gear, said gear and said first part being supported for relative axial movement toward each other and having a first position relative to each other in which they are blocked from engagement with each other, when said wedging means are in said effective position, and being movable beyond said first position toward each other for mutual engagement when they rotate in synchronism.

6. Apparatus according to claim 5, wherein said cage means include projecting extensions for securing said cage means to said synchronizing ring, and wedging surfaces cooperating with said wedging members.

References Cited in the file of this patent

UNITED STATES PATENTS

| | | |
|---|---|---|
| 1,853,988 | Murray | Apr. 12, 1932 |
| 1,946,177 | Neurath | Feb. 6, 1934 |
| 1,954,126 | Griswold | Apr. 10, 1934 |
| 2,190,964 | White | Feb. 20, 1940 |
| 2,299,373 | Bergstrom | Oct. 20, 1942 |
| 2,338,428 | Guter et al. | Jan. 4, 1944 |
| 2,438,381 | Banker | Mar. 23, 1948 |
| 2,547,732 | Baker | Apr. 3, 1951 |
| 2,562,466 | Kesterton | July 31, 1951 |
| 2,571,474 | Ochs et al. | Oct. 16, 1951 |

FOREIGN PATENTS

| | | |
|---|---|---|
| 1,134,866 | France | Dec. 10, 1956 |